(12) United States Patent
Chou et al.

(10) Patent No.: US 8,259,217 B2
(45) Date of Patent: Sep. 4, 2012

(54) FAST FOCUSING METHOD FOR DIGITAL CAMERA

(75) Inventors: Chan-Min Chou, Taipei County (TW); Chia-Lun Tsai, Changhua County (TW); Chih-Pin Yen, Taipei County (TW)

(73) Assignee: Altek Corporation, Hsinchu (TW)

( * ) Notice: Subject to any disclaimer, the term of this patent is extended or adjusted under 35 U.S.C. 154(b) by 358 days.

(21) Appl. No.: 12/784,762

(22) Filed: May 21, 2010

(65) Prior Publication Data

US 2011/0058096 A1     Mar. 10, 2011

(30) Foreign Application Priority Data

Sep. 9, 2009   (TW) ............................... 98130448 A (51) Int. Cl.
*H04N 5/232* (2006.01)
(52) U.S. Cl. ...................... 348/353; 348/349
(58) Field of Classification Search .......... 348/353, 348/349, 208.12, 345, 352, 348, 354, 355
See application file for complete search history.

(56) References Cited

U.S. PATENT DOCUMENTS

| | | | | |
|---|---|---|---|---|
| 4,500,925 A | * | 2/1985 | Hanma et al. | 348/356 |
| 4,719,486 A | * | 1/1988 | Hoshino et al. | 396/96 |
| 5,325,146 A | * | 6/1994 | Toji | 396/81 |
| 5,694,168 A | * | 12/1997 | Toji | 348/350 |
| 6,895,181 B2 | * | 5/2005 | Nonaka et al. | 396/125 |
| 7,598,997 B2 | * | 10/2009 | Shiraishi | 348/353 |
| 7,859,588 B2 | * | 12/2010 | Parulski et al. | 348/349 |
| 2004/0066563 A1 | * | 4/2004 | Voss et al. | 359/698 |
| 2008/0316325 A1 | * | 12/2008 | Nakahara | 348/222.1 |

* cited by examiner

*Primary Examiner* — Lin Ye
*Assistant Examiner* — Amy Hsu
(74) *Attorney, Agent, or Firm* — Morris, Manning & Martin, LLP; Tim Tingkang Xia, Esq.

(57) ABSTRACT

A fast focusing method for a digital camera is applied in an auto focusing stage for judging whether the digital camera needs to be refocused. The fast focusing method includes recording a system time after a previous focusing (defined as a first time); capturing a system time before a current focusing (defined as a second time); performing a fuzziness detection procedure to acquire a focus value when a difference obtained by subtracting the first time from the second time is greater than a focusing time threshold; setting a focusing focal length range covering a reference focal length when the focus value is between a lower limit focusing threshold and an upper limit focusing threshold; capturing images at different focusing focal lengths respectively in the focusing focal length range; calculating a contrast value of each image; calculating a target focal length from the contrast values through a quadratic curve approximation method.

8 Claims, 14 Drawing Sheets

FAST FOCUSING METHOD FOR DIGITAL CAMERA

CROSS-REFERENCE TO RELATED APPLICATIONS

This non-provisional application claims priority under 35 U.S.C. §119(a) on Patent Application No(s). 098130448 filed in Taiwan, R.O.C. on Sep. 9, 2009, the entire contents of which are hereby incorporated by reference.

BACKGROUND OF THE INVENTION

1. Field of Invention

The present invention relates to a focusing method, and more particularly to a focusing method for a digital camera for determining a focusing focal length that needs to be adjusted in an auto focusing stage.

2. Related Art

A user usually takes a picture with a digital camera in the following several stages. First, the digital camera is turned on; at this time, the digital camera enters a live view stage. Second, the user half presses a shutter after aiming at an object to be shot, and at the same time, the digital camera enters an auto focusing stage. Third, the user fully presses the shutter, and at this time, the digital camera enters a shooting stage and shoots the corresponding image picture.

The auto focusing stage refers to a focusing stage in which focusing is performed on the object to be shot and the shutter is not fully pressed for shooting. Briefly, it is a process in which the digital camera focuses on the object to be shot when the shutter is half pressed. During this process, a lens of the digital camera is moved to different focus positions (i.e., to different lens positions or steps, which are image sampling steps), and a degree of clarity or fuzziness of the image is determined according to a focus value acquired at each lens position.

Conventional focusing algorithms include a global search algorithm, a hill-climbing search algorithm, and a binary search algorithm. An effective search algorithm needs to consider the time required for search, the number of times for moving the lens, and search correctness. If too much search time is spent, the efficiency of auto focusing is lowered. If the lens is moved for too many times, additional battery power of the digital camera is consumed. On the contrary, the imaging quality of the digital camera is influenced.

Figure 1:
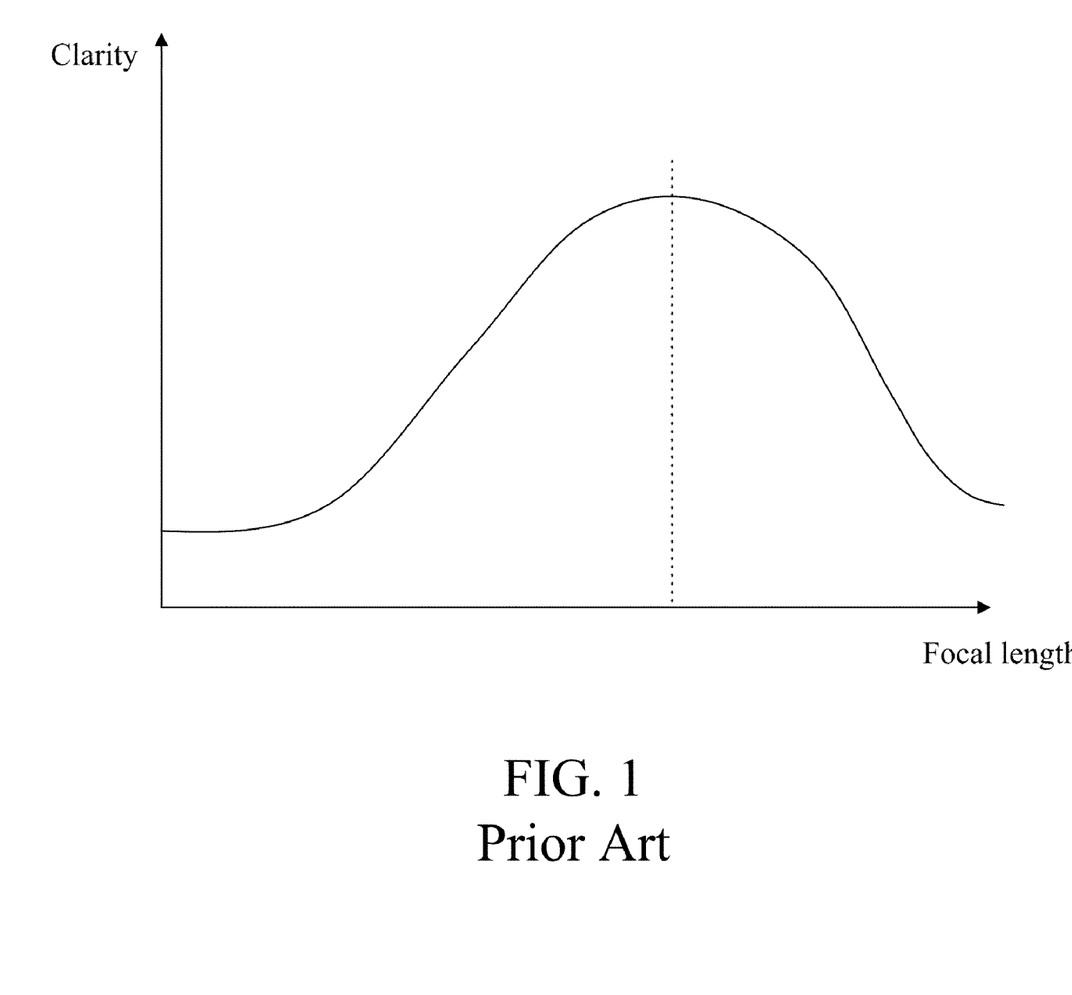
FIG. 1 is a diagram of a contrast value curve in the prior art.

For example, in the global search algorithm, a digital image acquired each time the lens is moved by one step is recorded; afterwards, a lens position corresponding to a digital image having the highest clarity is extracted; then, the lens is moved to the position corresponding to the highest clarity to achieve auto focusing, as shown in the diagram of a contrast value curve of FIG. 1.

Although the prior art can find out a focusing focal length for the object to be shot precisely, the digital camera still needs to refocus each time the digital camera performs focusing. In this way, the focusing time and power consumption of the digital camera are influenced.

SUMMARY OF THE INVENTION

Accordingly, the present invention is a fast focusing method for a digital camera, suitable for the digital camera to prejudge whether it is too close to an execution time of a previous focusing and then determine to adjust a focusing focal length to a target focal length in an auto focusing stage.

In order to achieve the above objective, the present invention provides a fast focusing method for a digital camera, which comprises: loading a system time after a previous focusing and defining it as a first time (T1); capturing a system time before a current focusing and defining it as a second time (T2); performing a fuzziness detection procedure to acquire a focus value when a difference obtained by subtracting the first time from the second time (T2−T1) is greater than a focusing time threshold; setting a focusing focal length range covering a reference focal length when the focus value is between a lower limit focusing threshold and an upper limit focusing threshold; capturing corresponding comparison images at different focusing focal lengths respectively in the focusing focal length range; calculating a contrast value of each of the comparison images; and selecting a maximum value from the contrast values, and setting a focal length corresponding to the selected contrast value as a target focal length.

The fuzziness detection procedure further comprises: setting at least one sampling area having a plurality of image pixels in the comparison image; comparing pixel values of every two adjacent image pixels in the sampling area respectively to obtain a plurality of contrast differences; accumulating the focus value if the contrast differences are greater than a preset threshold; and repeating the steps of calculation and accumulating the focus value until all the image pixels in the sampling area are completed.

Finally, it is judged whether the focal length needs to be adjusted according to the obtained focus value. When the focus value is between the lower limit focusing threshold and the upper limit focusing threshold, the focusing focal length range covering the reference focal length is set. Corresponding images are captured at different focusing focal lengths respectively in the focusing focal length range. The contrast value of each image is calculated. The target focal length is calculated from the contrast values through a quadratic curve approximation method.

In the present invention, it is judged whether refocusing needs to be performed on a currently captured digital image according to shooting time of two continuous digital images and through a fuzziness detection procedure. If a focal length of an object to be shot in the current digital image and a focal length of the previous digital image are less than a threshold, search does not need to be performed from a shortest focusing end to a longest focusing end. In this way, power consumption for moving the lens is effectively lowered, and time for comparison is reduced.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 2:
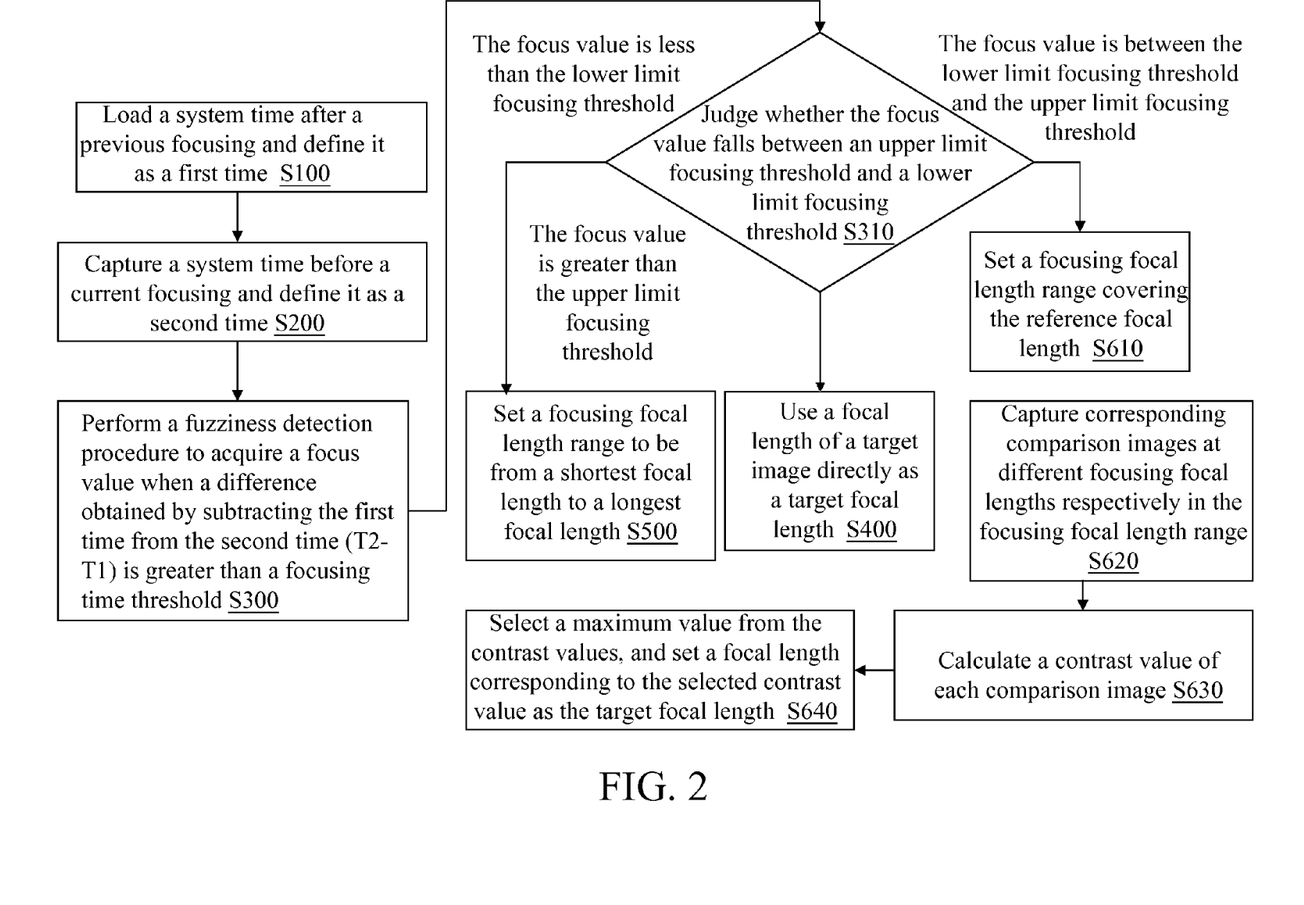
FIG. 2 is an operation flow chart of a fast focusing procedure in the present invention.

In the present invention, a digital camera adjusts a focusing focal length to a target focal length of an object to be shot rapidly in an auto focusing stage. When an interval between a system time of a previous focusing and a system time of a current focusing is less than a focusing threshold, the digital camera further judges whether a lens arrangement of a lens group needs to be readjusted. FIG. 2 is an operation flow chart of a fast focusing procedure in the present invention. The fast focusing procedure comprises the following steps.

In Step S100, a system time of a previous focusing and a reference focal length are loaded, and the system time is defined as a first time (T1).

In Step S200, a system time before a current focusing is captured and defined as a second time (T2).

In Step S300, when a difference obtained by subtracting the first time from the second time (T2−T1) is greater than a focusing time threshold, a fuzziness detection procedure is performed to acquire a focus value.

In Step S310, it is judged whether the focus value falls between an upper limit focusing threshold and a lower limit focusing threshold.

In Step S400, when the focus value is greater than the upper limit focusing threshold, a focal length of a target image is directly used as a target focal length.

In Step S500, when the focus value is less than the lower limit focusing threshold, a focusing focal length range is set to be from a shortest focal length to a longest focal length.

In Step S610, when the focus value is between the lower limit focusing threshold and the upper limit focusing threshold, a focusing focal length range covering the reference focal length is set.

In Step S620, corresponding comparison images are captured at different focusing focal lengths respectively in the focusing focal length range.

In Step S630, a contrast value of each comparison image is calculated.

In Step S640, a maximum value is selected from the contrast values, and a focal length corresponding to the selected contrast value is set as the target focal length.

Figure 3:
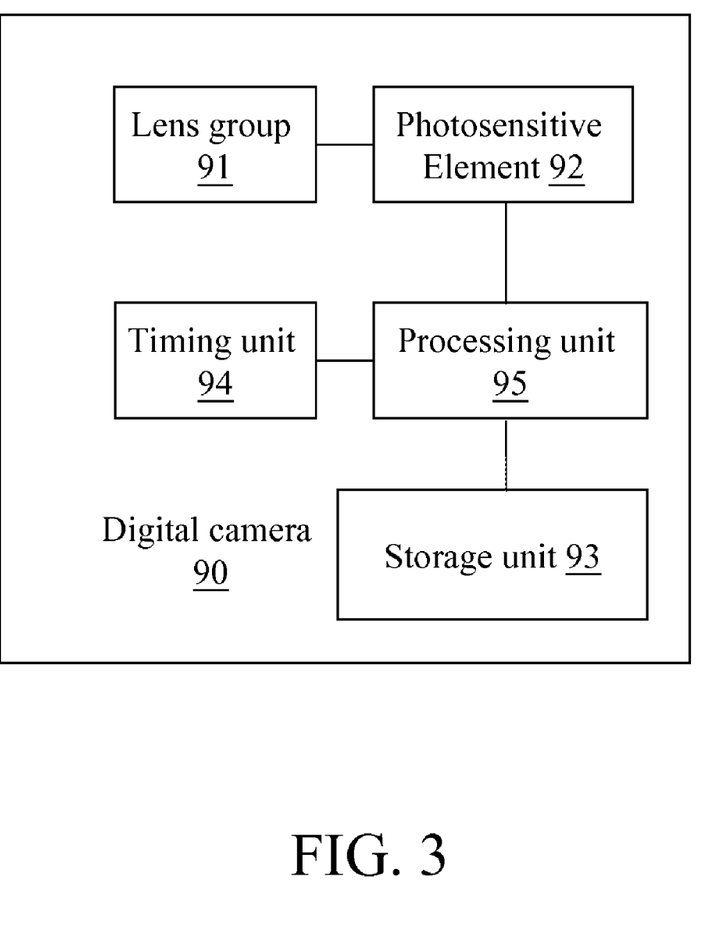
FIG. 3 is a schematic architectural view of a digital camera to which the present invention is applicable.

An operation mode of the present invention is explained further herein according to the following digital camera. The digital camera may be, but is not limited to, a digital camera shown in FIG. 3. In order to illustrate the method in the present invention more clearly, please refer to FIGS. 2 and 3 at the same time. FIG. 3 is a schematic architectural view of the digital camera to which the present invention is applicable. The digital camera 90 at least comprises a lens group 91, a photosensitive element 92, a storage unit 93, a timing unit 94, and a processing unit 95.

The lens group 91 has a drive motor (not shown) and a plurality of lenses (not shown). The lens group 91 is used to adjust a focal length for shooting an object. The drive motor is used to adjust distances between the lenses so as to provide different focusing focal lengths. The photosensitive element 92 is connected to the lens group 91, and converts an image picture of a current scene into an electrical signal of a digital image. The photosensitive element 92 continuously transmits received image signals to the processing unit 95. The processing unit 95 is electrically connected to the photosensitive element 92 and the storage unit 93. The storage unit 93 is used to store digital images and the fast focusing procedure. The timing unit 94 is used to record a recording time of the digital image captured each time. The processing unit 95 not only performs image processing on the digital image, but also performs the fast focusing procedure according to the acquired digital image. The processing unit 95 records the current focusing focal length and time in the storage unit 93 each time the focusing is completed. In order to illustrate focusing information at different time clearly, a focusing time previously recorded is defined as a first time, and a current focusing time is defined as a second time. A focusing focal length at the first time is recorded as a reference focal length, and an image shot at the second time is defined as a target image (corresponding to Steps S100-S200).

Figure 4:
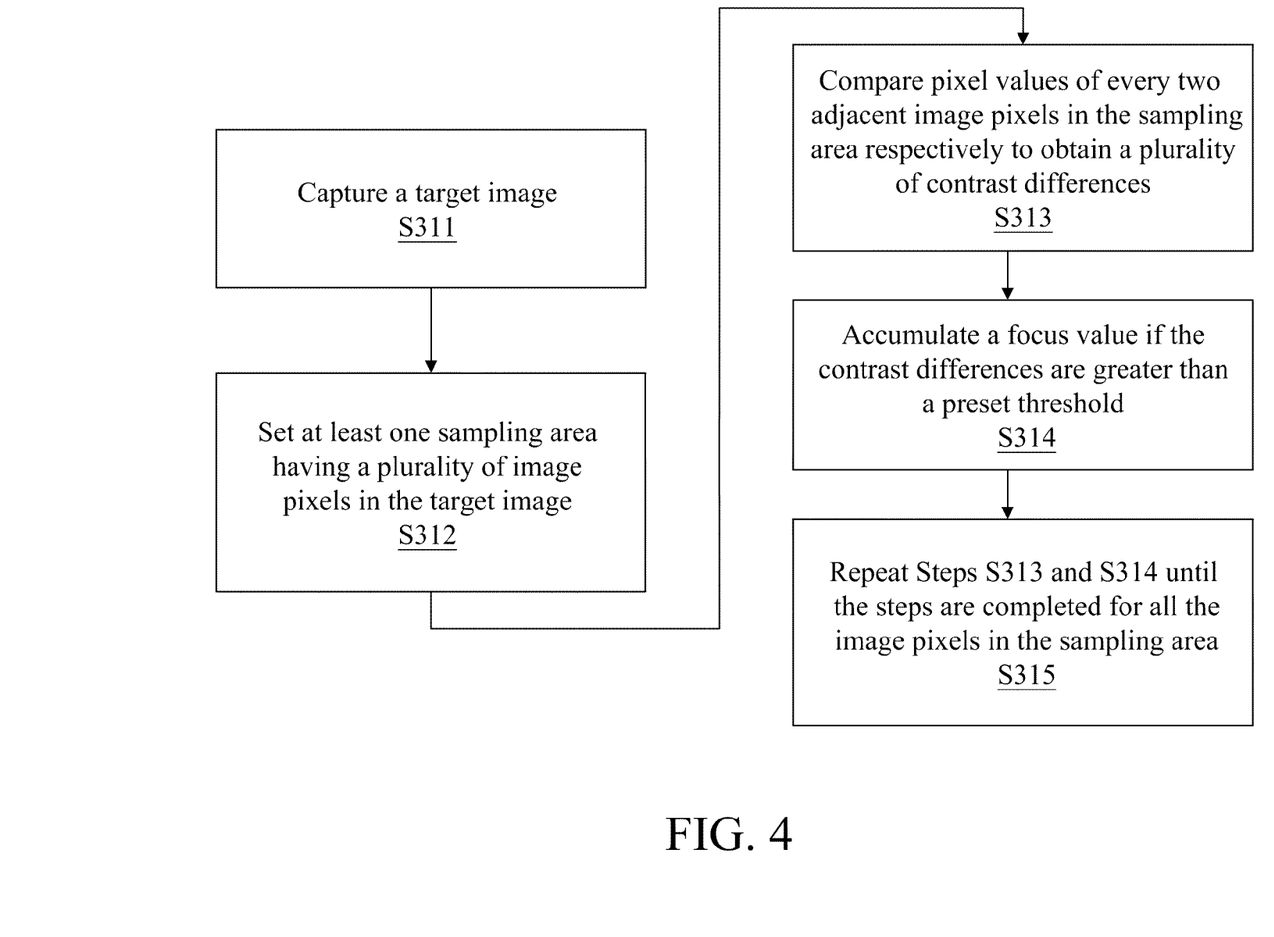
FIG. 4 is a schematic flow chart of a first fuzziness detection procedure in the present invention.

When a difference obtained by subtracting the first time from the second time (T2−T1) is less than a focusing time threshold, refocusing is not performed. When the difference obtained by subtracting the first time from the second time (T2−T1) is greater than the focusing time threshold, the processing unit 95 starts to perform the fuzziness detection procedure on the digital image to acquire a focus value (corresponding to Step S300). FIG. 4 is a schematic view of an implementation aspect of a first fuzziness detection procedure in the present invention. Referring to FIG. 4, the procedure is as follows.

In Step S311, a target image is captured.

In Step S312, at least one sampling area is set in the target image. The sampling area has a plurality of image pixels.

In Step S313, pixel values of every two adjacent image pixels in the sampling area are respectively compared to obtain a plurality of contrast differences.

In Step S314, the focus value is accumulated if the contrast differences are greater than a preset threshold.

In Step S315, Steps S313 and S314 are repeated until the steps are completed for all the image pixels in the sampling area.

Figure 5:
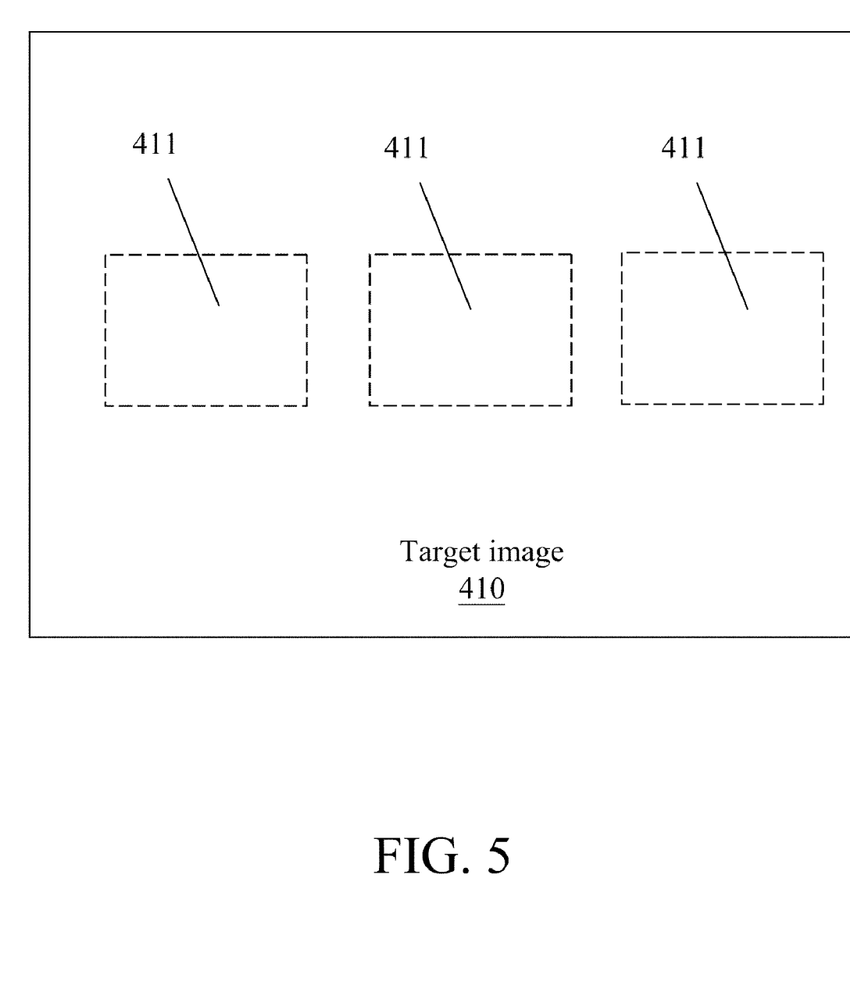
FIG. 5 is a schematic view of a sampling area in the present invention.

FIG. 5 is a schematic view of the sampling area. As shown in FIG. 5, in the first fuzziness detection procedure, at least one sampling area is further defined in the target image 410. The sampling area may be, but is not limited to, the entire target image 410, and may also be a focusing frame 411 at a preset fixed position or a face focusing frame 411 produced after face detection (corresponding to Steps S311-S312). A plurality of focusing frames 411 is set in the digital camera 90 and distributed at fixed positions in the target image 410. The focusing frame 411 is used to provide a reference position for the digital camera 90 to focus a scene to be shot. For example, when the focusing frame 411 is in a central area, the digital camera 90 preferentially takes an object to be shot in the central area as a basis for focusing; when the focusing frame 411 is in a left area, the digital camera 90 takes an object to be shot in the left area as the basis for focusing.

When the digital camera 90 sets the focusing frame 411 thereof to be the focusing frame 411 in the central area, the digital camera 90 performs focusing and comparison on the object to be shot of the focusing frame 411 (corresponding to Step S313). Similarly, the focusing frames 411 in other areas and positions also provide the same function. The face focusing frame 411 is the corresponding focusing frame 411 produced according to a face area judged by the digital camera 90. If a plurality of face focusing frames 411 appears at the same time, in this implementation aspect of the present invention, it is assumed that the face focusing frame 411 having the shortness focal length is taken as the sampling area for judgment. In other words, the face focusing frame 411 closest to the digital camera 90 is taken as the sampling area.

Figure 6:
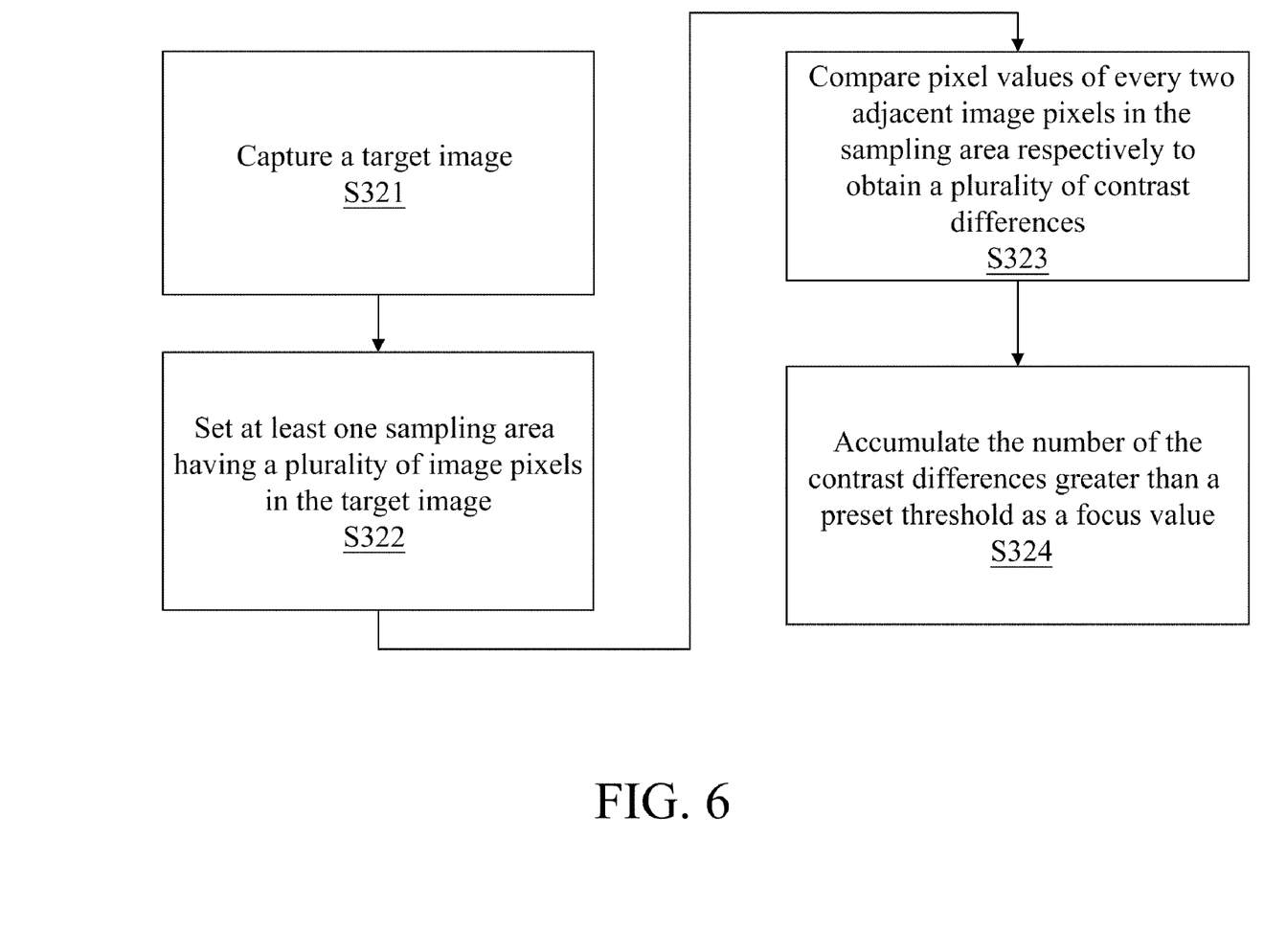
FIG. 6 is a schematic flow chart of a second fuzziness detection procedure in the present invention.

In the first implementation aspect, the pixel values of every two adjacent image pixels in the sampling area are calculated repeatedly so as to produce a corresponding set of contrast difference. Different from the first implementation aspect in which the focus value is not accumulated until all the contrast differences are calculated (corresponding to Steps S314-S315), the present invention may also change the accumulation step in Step S314 to a step of judging whether to accumulate the focus value each time the calculation of the comparison difference is completed. An operation process of a second implementation aspect is shown in FIG. 6.

The second implementation aspect comprises the following steps.

In Step S321, a target image is captured.

In Step S322, at least one sampling area having a plurality of image pixels is set in the target image.

In Step S323, pixel values of every two adjacent image pixels in the sampling area are compared respectively to obtain a plurality of contrast differences.

In Step S324, the number of the contrast differences greater than a preset threshold is accumulated as a focus value.

Figure 7A:
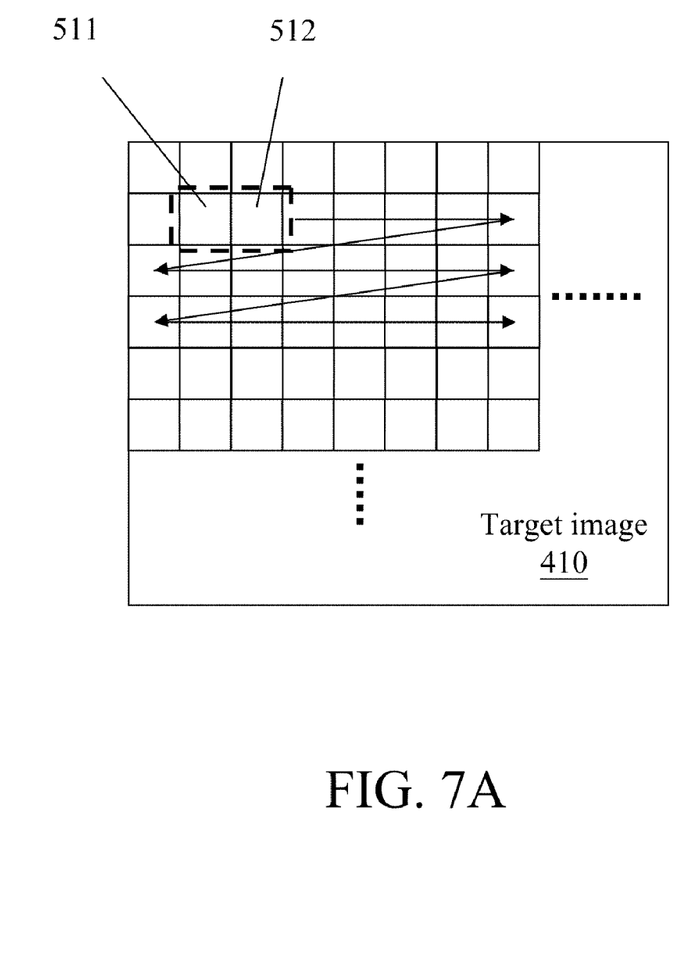
FIG. 7A is a schematic view illustrating a process for selecting horizontally adjacent pixels in the present invention.
Figure 7B:
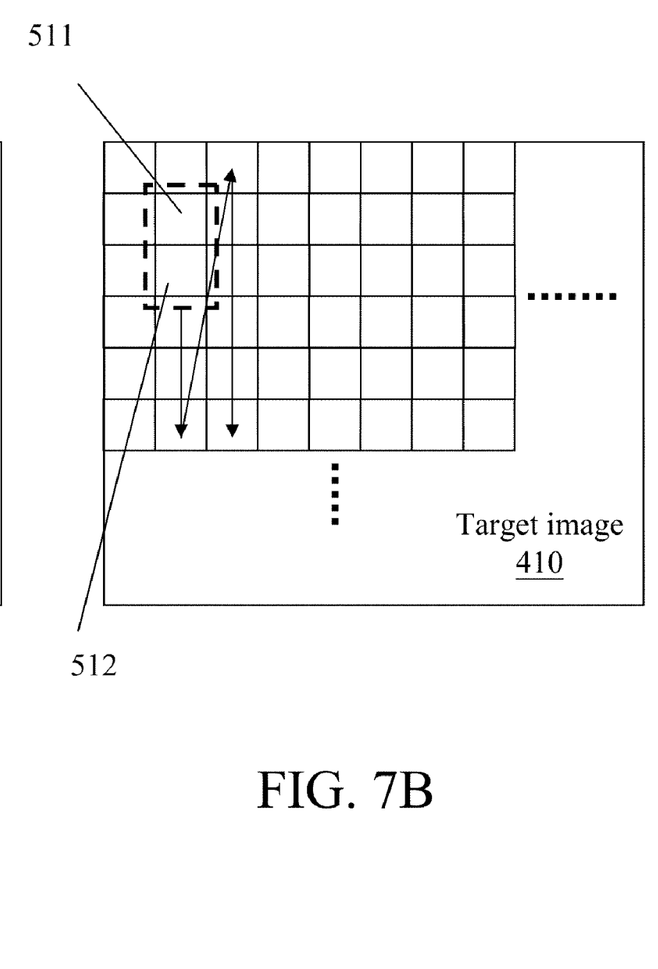
FIG. 7B is a schematic view illustrating a process for selecting vertically adjacent pixels in the present invention.

In the process for calculating the contrast differences in the second implementation aspect, two adjacent image pixels are respectively selected for processing. FIGS. 7A and 7B are respectively schematic views illustrating a process for selecting horizontally adjacent pixels and vertically adjacent pixels. Here, an image pixel to be compared is defined as a target pixel 512, and another adjacent pixel that is selected is defined as a comparison pixel 511. The selection of the comparison pixel 511 may be selecting a pixel horizontally or vertically adjacent to the target pixel. The target pixel 512 may be selected sequentially according to a pixel arrangement in the sampling area (corresponding to Step S322).

For example, if a pixel set in the sampling area is a two-dimensional array (it is assumed that the pixel set is a pixel_array[m][n] pixel array), the target pixel 512 is selected by moving one by one from a position having a minimum serial number (i.e., pixel_array[0][0]) to a position having a maximum serial number (i.e., pixel_array[0][n−1]) of the array. After the movement is completed for all pixels in each row, it is performed from the current row to a next row, as shown by arrows in FIG. 7A. The comparison pixel 511 may be selected from a next pixel (in a horizontal direction or vertical direction) of the target pixel 512. Then, the comparison pixel 511 is subtracted from the selected target pixel 512 so as to produce a contrast difference corresponding to the target pixel 512. Afterwards, other target pixels 512 are selected sequentially from the target image 410, and corresponding contrast differences are calculated (corresponding to Step S323).

Figure 7C:
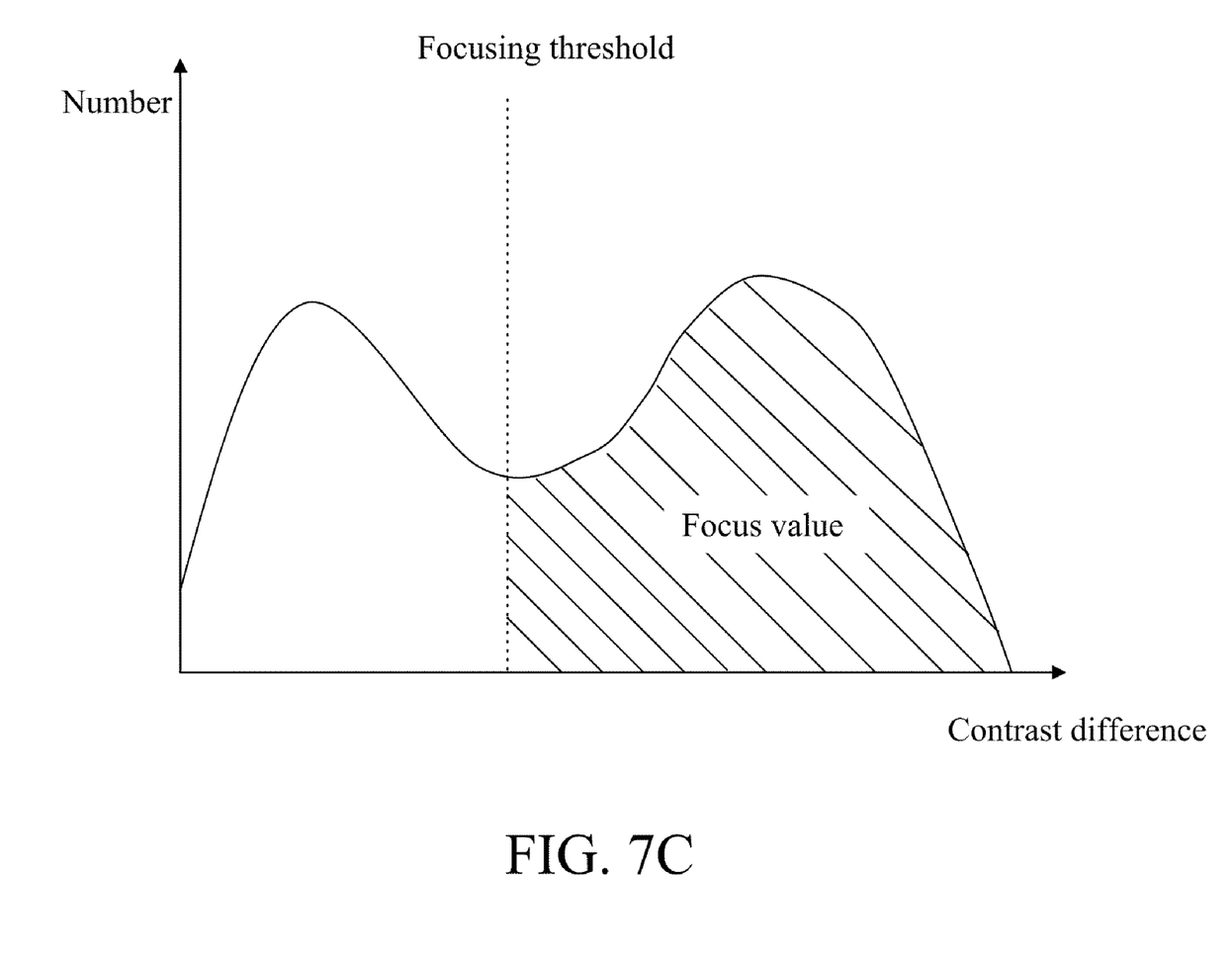
FIG. 7C is a schematic view illustrating a process for obtaining a focus value in the present invention.

Finally, the number of comparison differences greater than the preset threshold is counted, and the calculated number is used as the focus value (corresponding to Step S324). If observations are made through a statistical diagram, FIG. 7C is taken as an example. In FIG. 7C, the horizontal axis represents the contrast difference, the longitudinal axis represents the number, and the focus value is an area of the oblique line area in the right of FIG. 7C.

Figure 8:
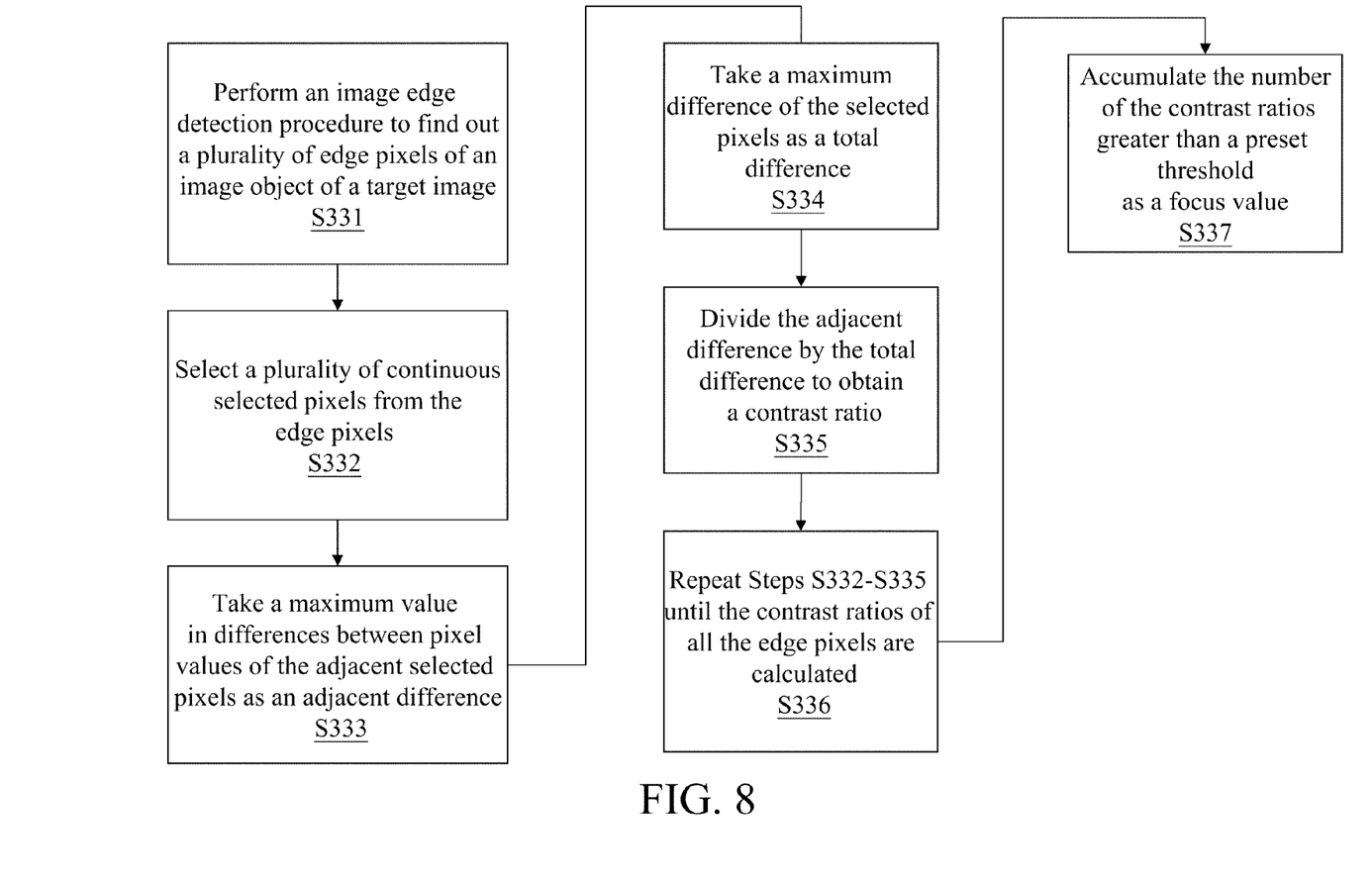
FIG. 8 is a schematic flow chart of a third fuzziness detection procedure in the present invention.

In addition to the above steps, the fuzziness detection procedure may further be performed in the following variations. FIG. 8 is a schematic view of an implementation aspect of a third fuzziness detection procedure in the present invention. The third fuzziness detection procedure comprises the following steps.

In Step S331, an image edge detection procedure is performed to find out a plurality of edge pixels of an image object of a target image.

In Step S332, a plurality of continuous selected pixels is selected from the edge pixels.

In Step S333, a maximum value in differences between pixel values of the adjacent selected pixels is taken as an adjacent difference.

In Step S334, a maximum difference of the selected pixels is taken as a total difference.

In Step S335, the adjacent difference is divided by the total difference to obtain a contrast ratio.

In Step S336, Steps S332-S335 are repeated until the contrast ratios of all the edge pixels are calculated.

In Step S337, the number of the contrast ratios greater than a preset threshold is accumulated as a focus value.

Figure 9A:
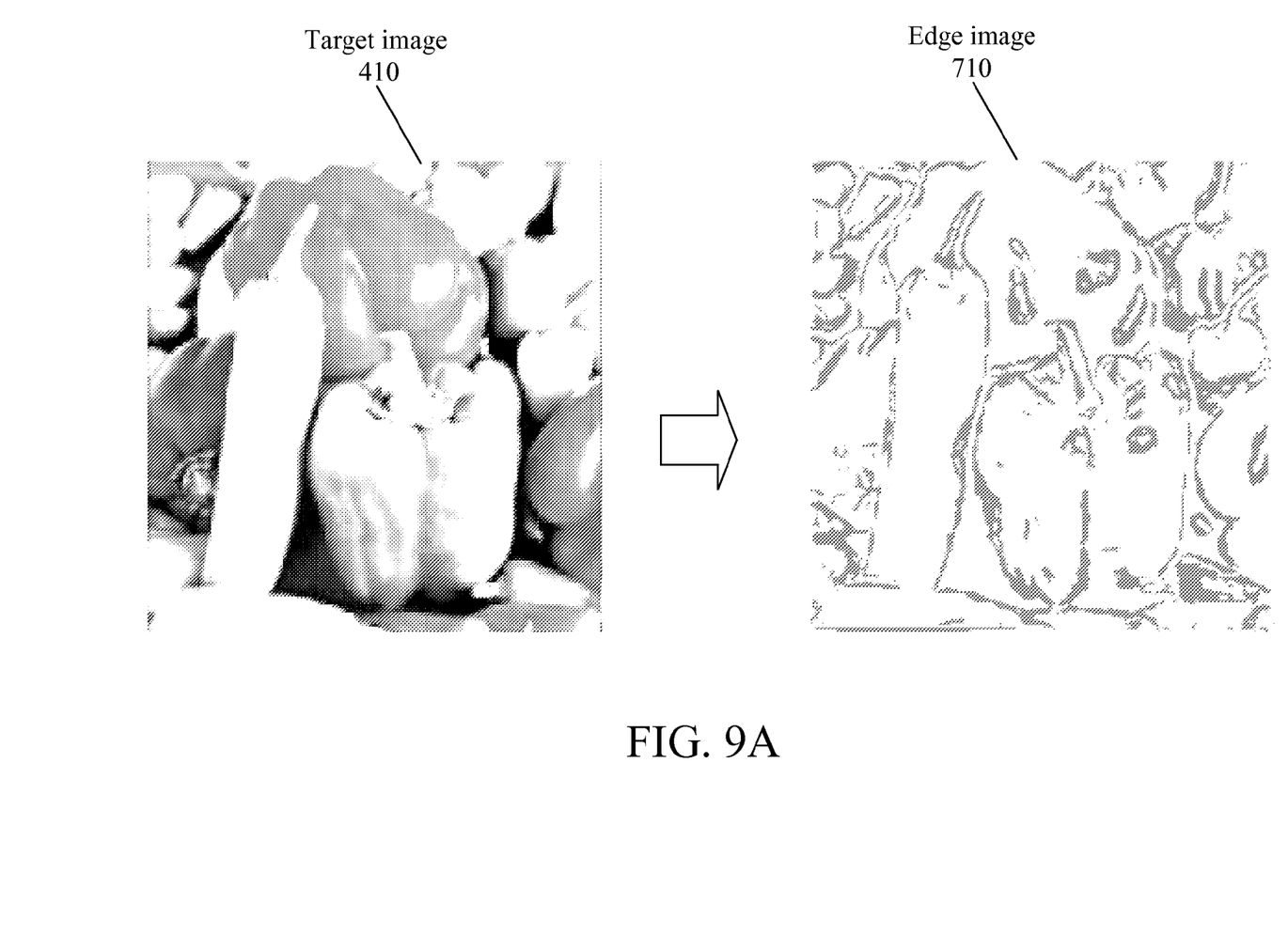
FIG. 9A is a schematic view of the edge of an image object in a target image in the present invention.

In this implementation aspect, the target image 410 is processed through the image edge detection procedure to produce a corresponding edge image 710 (corresponding to Step S331), and the edge image 710 has a plurality of edge pixels. The edge detection algorithm described in the present invention may be a Sobel edge detection algorithm, a Dijkstra's algorithm, a Canny edge detection algorithm, or the like. FIG. 9A is a schematic view of the edge of the image object in the target image.

Figure 9B:
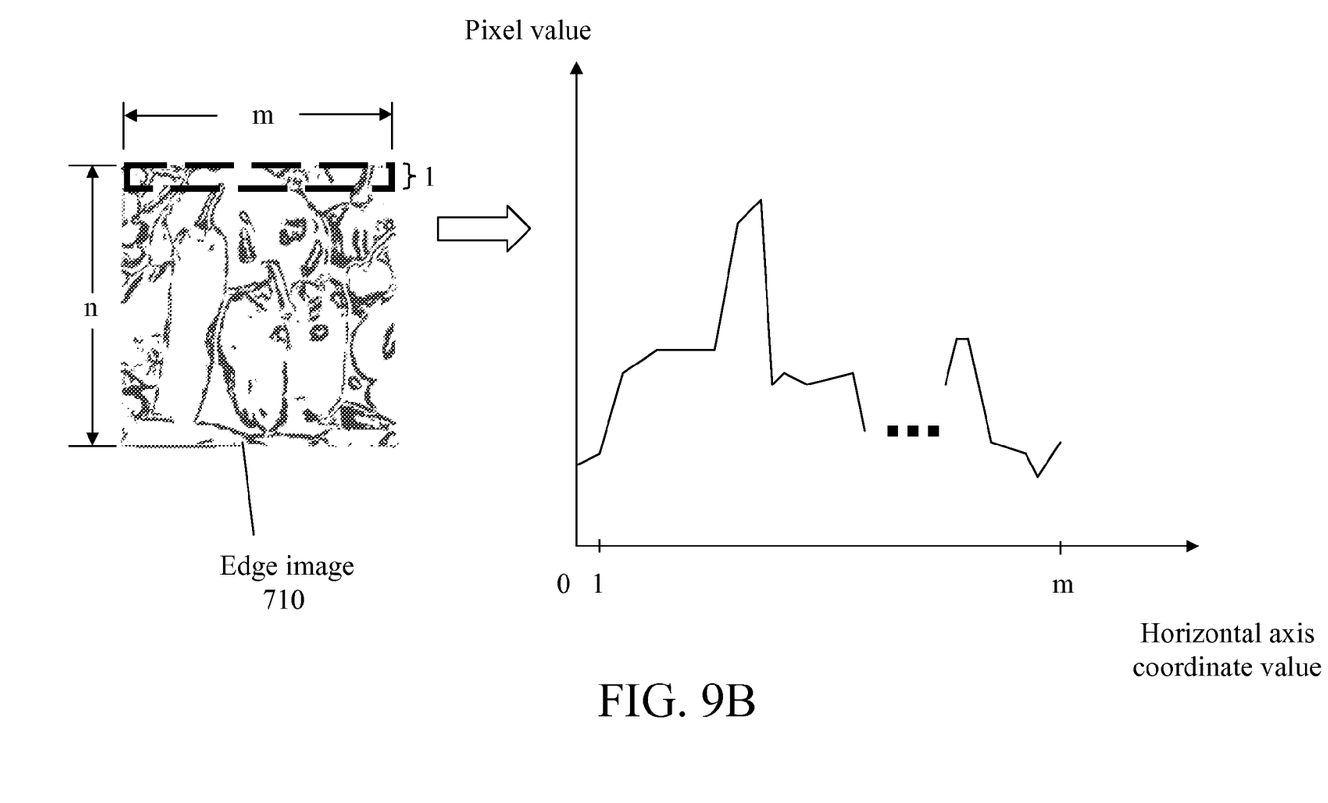
FIG. 9B is a schematic view of the edge of an image object in a target image in the present invention.

Referring to FIG. 9B, pixel values of the edge image 710 are read sequentially in a row major/column major mode so as to produce a corresponding gray scale distribution curve. For example, if the edge image 710 is deemed as a two-dimensional array (for example, the edge image 710 is deemed as a pixel_array[m][n] pixel array), pixel values (which are defined as selected pixels), i.e., pixel_array[0][x], x={0, 1 . . ., n−1}, are read sequentially from the first row of the edge image 710 in the row major mode, and pixel values and positions of the selected pixels are respectively recorded in a gray scale distribution curve. After the pixel values of the first row of the edge image 710 are read, a gray scale distribution curve corresponding to the first row is output, and reading is performed on other rows in other edge images 710 for corresponding gray scale distribution curves. In addition to this, reading for the gray scale distribution curves may also be performed in the column major mode (corresponding to Steps S332-S333).

Figure 9C:
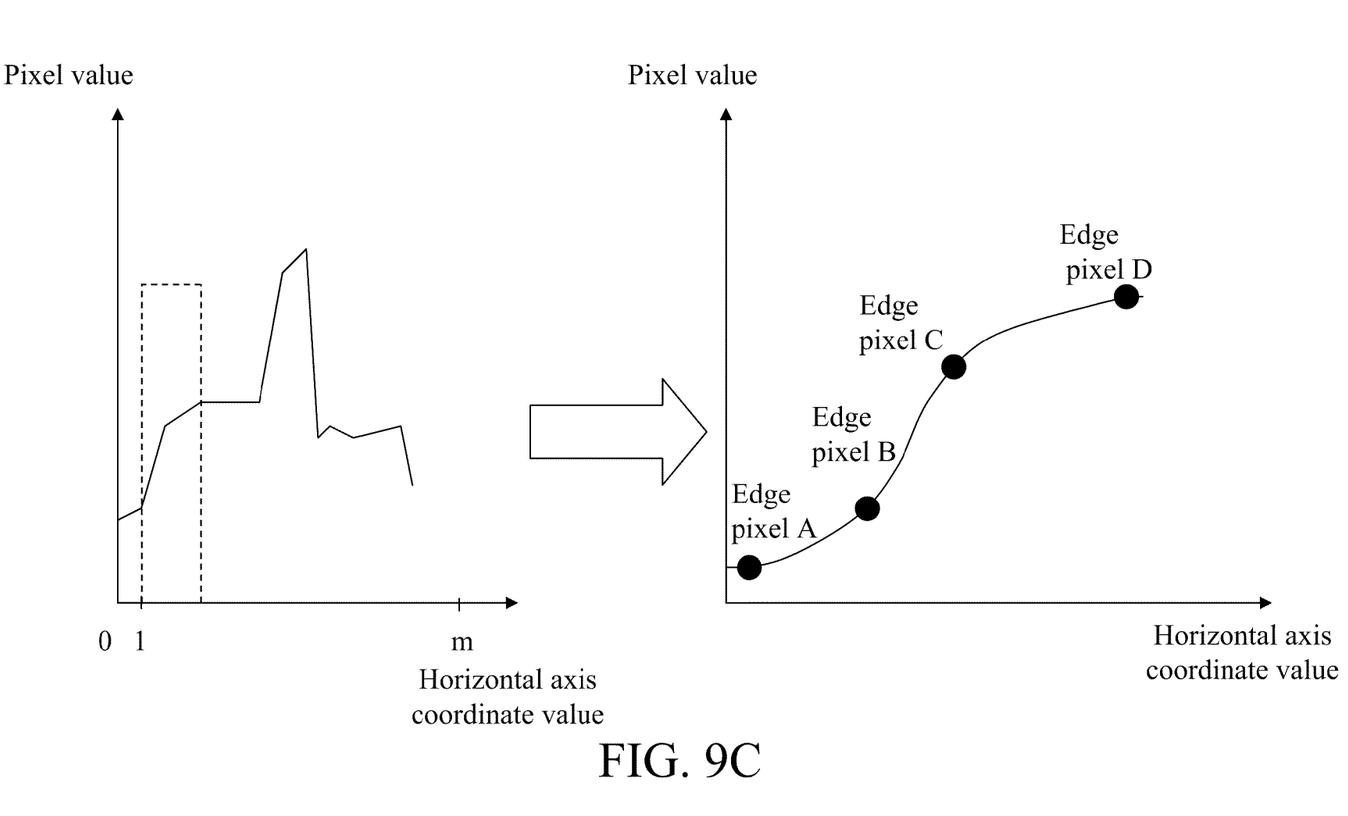
FIG. 9C is a schematic view of edge pixel selection in the present invention.

Then, a segment having a pixel variation exceeding a variation threshold is selected from the gray scale distribution curve, and is defined as an edge segment. A plurality of edge pixels is selected from the edge segment. FIG. 9C is taken as an example for illustration, in which four edge pixels A, B, C, and D (an area circled by a dashed line in FIG. 9C) exist. Every two adjacent edge pixels are selected successively. Here, each group of contrast distribution values is defined as an edge pixel set. Therefore, the edge pixels may be divided into three edge pixel sets (A,B), (B,C), and (C,D) and a total pixel set (A,D). Each edge pixel set correspondingly has a respective difference, and the total pixel set also has a total difference. An edge pixel set having a maximum difference is selected from the three edge pixel sets, and the selected set having the maximum difference is divided by the total difference to obtain a contrast ratio. In this implementation aspect, (X,Y) is an absolute value of a value obtained by subtracting an X pixel value from a Y pixel value. Refer to the following Formula 1:

$$Max((A,B),(B,C),(C,D))/(D,A) \quad \text{(Formula 1)}$$

The following example is taken herein for illustration. It is assumed that four pixels A=38, B=46, C=68, and D=82 are selected from the edge segment. The edge pixel sets are respectively (A, B), (B, C), and (C, D), which are respectively (A, B)=8, (B, C)=22, and (C, D)=14, and the total difference is (A, D)=44. A maximum value of the three edge pixel sets is 22, so that the adjacent difference is (B, C), and thus the contrast ratio is 22/44=0.5.

If only two pixels exist in the edge segment, a difference of this edge segment is not calculated, because this would cause the contrast ratio of this edge segment to become 1 so that whether the edge segment is an edge of the image object cannot be judged accurately. After this edge segment is calculated, the calculation of other edge segments in the gray scale distribution curve is continued to obtain the rest differences. Then, comparison is performed on the differences to determine whether they are greater than the preset threshold after the differences are obtained. The number of all the differences greater than the present threshold is calculated, and the accumulated number is defined as the focus value (corresponding to Steps S333-S337).

Figure 10:
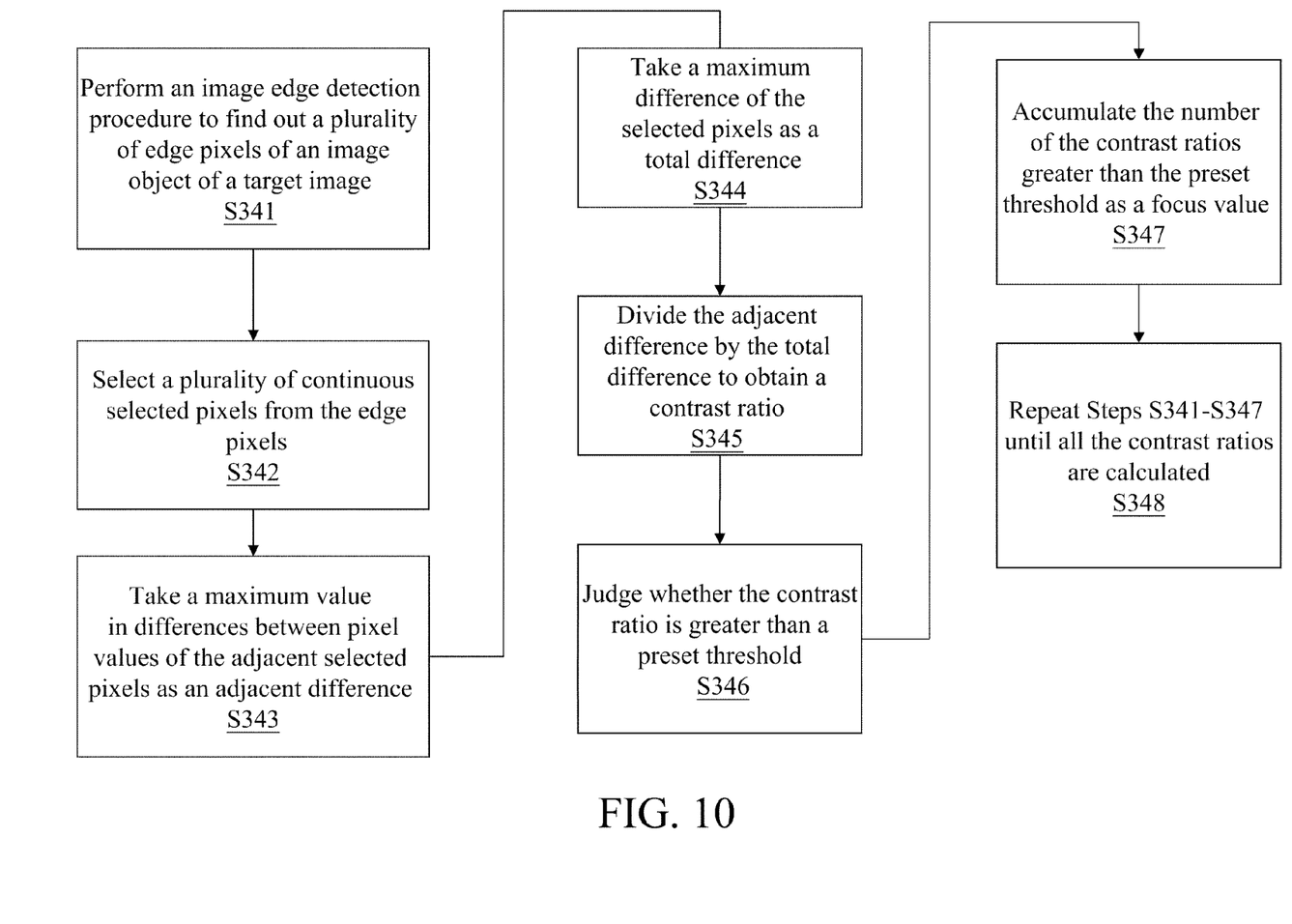
FIG. 10 is a schematic flow chart of a fourth fuzziness detection procedure in the present invention.

Different from the third implement aspect in which the focus value is not accumulated until all the contrast ratios are accumulated, the fourth implementation aspect first calculates a contrast ratio, judges whether the produced contrast ratio is greater than the preset threshold, and repeats this step until all the contrast ratios are calculated. FIG. 10 is a schematic flow chart illustrating another operation of the fourth implementation aspect.

In Step S341, an image edge detection procedure is performed to find out a plurality of edge pixels of an image object of a target image.

In Step S342, a plurality of continuous selected pixels is selected from the edge pixels.

In Step S343, a maximum value in differences between pixel values of the adjacent selected pixels is taken as an adjacent difference.

In Step S344, a maximum difference of the selected pixels is taken as a total difference.

In Step S345, the adjacent difference is divided by the total difference to obtain a contrast ratio.

In Step S346, it is judged whether the contrast ratio is greater than a preset threshold.

In Step S347, the number of the contrast ratios greater than the preset threshold is accumulated as a focus value.

In Step S348, Steps S341-S347 are repeated until all the contrast ratios are calculated.

After the above fuzziness procedure (i.e., Step S300) is completed, the processing unit 95 compares the focus value, a lower limit focusing threshold, and an upper limit focusing threshold to determine their relationships. When the focus value is greater than the upper limit focusing threshold, a focal length of the target image is directly used as a target focal length (corresponding to Step S400). When the focus value is less than the lower limit focusing threshold, a focusing focal length range is set to be from a shortest focal length to a longest focal length (corresponding to Step S500). When the focus value falls between the lower limit focusing threshold and the upper limit focusing threshold, the processing unit 95 sets a focusing focal length range covering the reference focal length (corresponding to Steps S600-S610). In the present invention, the reference focal length is set to be the longest focal length of the focusing focal length range. Certainly, the reference focal length may also be set to be the shortest focal length of the focusing focal length range or set to be in the focusing focal length range. Moreover, different comparison images are captured at different focusing focal lengths respectively in the focusing focal length range (corresponding to Step S620).

Then, for example, three digital images are captured in the focusing focal length range in the following description. Any variation made by persons skilled in the art to the number of the captured digital images shall fall within the scope of the present invention. When focusing on an object to be shot, the digital camera 90 will adjust from the shortest focal length of the focusing focal length range to the longest focal length of the focusing focal length range. Then, the processing unit 95 records a contrast value of each comparison image (corresponding to Step S630).

Finally, the target focal length is calculated from the contrast values through a quadratic curve approximation method, and the lens focal length is adjusted to the focal length. In this way, the digital camera 90 does not need to move between the original longest focusing focal length and shortest focusing focal length. Thus, the movement of lenses in the lens group 91 can be effectively reduced, thereby enhancing the focusing speed of the digital camera 90 and lowering the power consumption of the digital camera 90.

Figure 11:
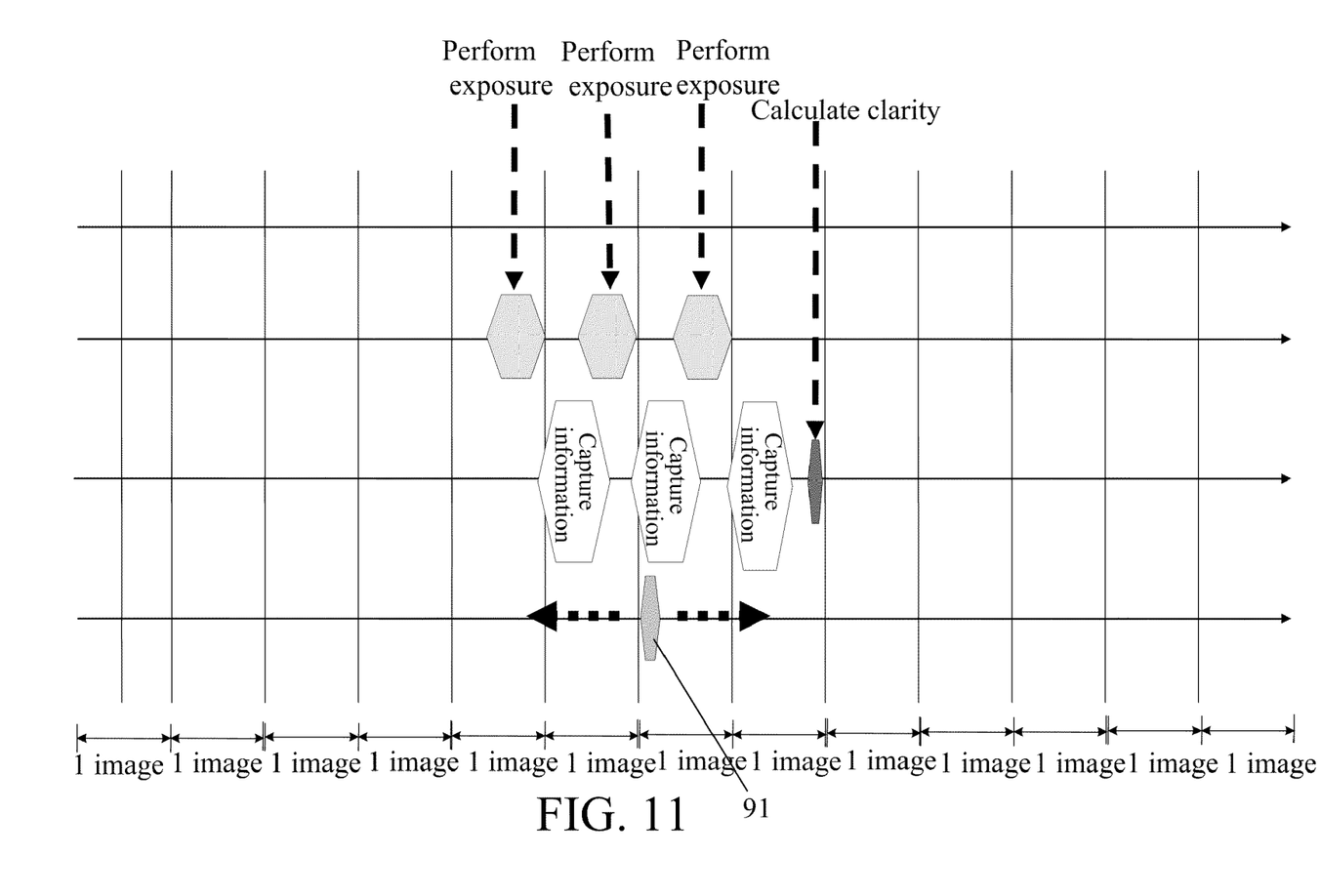
FIG. 11 is an operation timing diagram of the present invention.

In order to further illustrate the digital camera and the operation of the present invention, refer to FIG. 11, which is an operation timing diagram of the present invention. In FIG. 11, the horizontal axis represents a time interval for capturing digital images, and the longitudinal axis represents, from up to down, a time point for exposure, a time point for loading shooting information (for example, an exposure value, an aperture, photosensitivity, or the like) of the image, a time point for calculating the focus value, and a time point for determining to move the lenses respectively. After calculating the focus value, the processing unit 95 determines the position to which the lenses are moved according to the calculation result (corresponding to Step S640).

Finally, after the fast focusing procedure is completed, corresponding processing procedures are provided not only for the case that the focus value falls between the upper limit focusing threshold and the lower limit focusing threshold, but also for the case that the focus value is at different focusing thresholds in the implementation aspects of the present invention.

If the focus value is greater than the upper limit focusing threshold, it indicates that the current focal length is the focusing focal length most suitable for the object to be shot, and thus the digital camera 90 does not need to readjust the focusing focal length. If the focus value is less than the lower limit focusing threshold, it indicates that the focusing focal length of the digital camera 90 does not fall on the object to be shot, and thus the digital camera 90 needs to adjust the focusing focal length from the beginning. The digital camera 90 moves from the shortest focal length to the longest focal length and acquires corresponding images at different focal lengths, finds out the clearest image from the acquired images, and determines that a focal length of this image is the target focal length.

In the present invention, it is judged whether refocusing needs to be performed on a currently captured digital image according to shooting time and focal length of a previous digital image and through a fuzziness detection procedure. If a focal length of an object to be shot in the current digital image and the focal length of the previous digital image are less than a threshold, search does not need to be performed from the shortest focusing end to the longest focusing end. In this way, the power consumption of moving the lens is effectively lowered, and the time for comparison is reduced.

What is claimed is:

1. A fast focusing method for a digital camera, for adjusting a focusing focal length to a target focal length by the digital camera in an auto focusing stage, the focusing method comprising:
    loading a completion time of a previous focusing as a first time (T1) and a reference focal length;
    capturing a system time before a current focusing as a second time (T2);
    performing a fuzziness detection procedure to acquire a focus value when a difference obtained by subtracting the first time from the second time ($\Delta T=T2-T1$) is greater than a focusing time threshold; and
    performing following steps when the focus value falls between a lower limit focusing threshold and an upper limit focusing threshold:
    setting a focusing focal length range covering the reference focal length;
    capturing corresponding comparison images at different focusing focal lengths respectively in the focusing focal length range; calculating a contrast value of each of the comparison images; and
    selecting a maximum value from the contrast values and setting a focal length corresponding to the selected contrast value as the target focal length.

2. The fast focusing method for the digital camera according to claim 1, wherein the fuzziness detection procedure comprises:
    capturing a target image;
    setting at least one sampling area in the target image, wherein the sampling area has a plurality of image pixels;
    comparing pixel values of every two of the adjacent image pixels in the sampling area respectively to obtain a plurality of contrast differences;
    accumulating the focus value if the contrast differences are greater than a preset threshold; and
    repeating the steps of comparing pixels and accumulating the focus value until all the image pixels in the sampling area are completed.

3. The fast focusing method for the digital camera according to claim 1, wherein the fuzziness detection procedure comprises:
    capturing a target image;
    setting at least one sampling area in the target image, wherein the sampling area has a plurality of image pixels;
    comparing pixel values of every two of the adjacent image pixels in the sampling area respectively to obtain a plurality of contrast differences; and
    accumulating a number of the contrast differences greater than a preset threshold as the focus value.

4. The fast focusing method for the digital camera according to claim 1, wherein the fuzziness detection procedure comprises:
    performing an image edge detection procedure to find out a plurality of edge pixels of an image object of a target image;
    calculating a plurality of contrast ratios of the edge pixels sequentially; and
    accumulating a number of the contrast ratios greater than a preset threshold as the focus value;
    wherein the step of calculating the plurality of contrast ratios of the edge pixels sequentially comprises:
    selecting a plurality of continuous selected pixels from the edge pixels;
    taking a maximum value in differences between pixel values of the adjacent selected pixels as an adjacent difference;
    taking a maximum difference of the selected pixels as a total difference;
    dividing the adjacent difference by the total difference to obtain the contrast ratio; and
    repeating the above four steps until the contrast ratios of all the edge pixels are calculated.

5. The fast focusing method for the digital camera according to claim 1, wherein the fuzziness detection procedure comprises:
    performing an image edge detection procedure to find out a plurality of edge pixels of an image object of a target image;
    calculating a contrast ratio of each of the edge pixels;
    repeating the above steps until the contrast ratios of all the edge pixels are calculated; and
    accumulating a number of the contrast ratios greater than a preset threshold as the focus value;
    wherein the step of calculating the contrast ratio comprises:
    selecting a plurality of continuous selected pixels from the edge pixels;
    taking a maximum value in differences between pixel values of the adjacent selected pixels as an adjacent difference;
    taking a maximum difference of the selected pixels as a total difference; and
    dividing the adjacent difference by the total difference to obtain the contrast ratio.

6. The fast focusing method for the digital camera according to claim 1, wherein when the focus value is greater than the upper limit focusing threshold, a focal length of a target image is directly used as the target focal length.

7. The fast focusing method for the digital camera according to claim 1, wherein when the focus value is less than the lower limit focusing threshold, the focusing focal length range is set to be from a shortest focal length to a longest focal length.

8. The fast focusing method for the digital camera according to claim 1, wherein a current system time is recorded at a same time when the target focal length is obtained through selection.

* * * * *